April 17, 1951  M. R. SELDON  2,549,020
AUTOMATIC SPEED CONTROLLER
Filed Feb. 10, 1949  4 Sheets-Sheet 3

INVENTOR.
M. Robert Seldon
BY
M. B. Tasker
ATTORNEY

Patented Apr. 17, 1951

2,549,020

UNITED STATES PATENT OFFICE 2,549,020

AUTOMATIC SPEED CONTROLLER

Mark Robert Seldon, Stratford, Conn., assignor to United Aircraft Corporation, East Hartford, Conn., a corporation of Delaware Application February 10, 1949, Serial No. 75,551

14 Claims. (Cl. 244—113)

This invention relates to high speed aircraft and specifically to an automatic speed brake controller adapted to operate an air brake for restricting the speed of the aircraft.

It is an object of this invention to provide a mechanism that will automatically control the maximum speed of an aircraft under varied power and dive conditions.

It is another object of this invention to provide an air speed responsive device which will automatically extend or retract an air brake on an aircraft to limit the maximum speed thereof.

It is a further object of this invention to provide a speed responsive controlling mechanism wherein the actual speed of the aircraft is electrically measured and impressed as a voltage in a bridge circuit which includes a balancing leg representing the desired speed setting thereby obtaining a resultant signal which can actuate the air brake mechanism.

A still further object of this invention is to provide a control mechanism as described above wherein the resultant signal from the bridge is combined with that of a rate network which more closely regulates the speed of the aircraft during rapid accelerations or decelerations of the aircraft, and provides an anticipative type of action.

These and other objects and advantages will become apparent from the following description and drawings.

In these drawings.

Latest jet engine and rocket engine developments have produced means capable of propelling aircraft at such very great speeds, that the engine platform or airframe and wings can be destroyed by either direct aerodynamic forces of other forces caused by the high velocities. It has, accordingly, become necessary to place a restricting maximum speed at which a particular aircraft can fly. If this safe maximum speed is exceeded, disastrous results might ensue. Previously manually operated speed brakes have been used wherein the pilot of an aircraft could actuate a strut to extend surfaces into the air stream to produce high parasitic drag or disturb some aerodynamic flow to induce drag; however, the pilot of present day aircraft is already over-burdened with the many operations he must perform. Consequently, this device, which functions automatically, once set, can effectively control the speed of an aircraft and can keep the velocity or Mach number below a certain desired value.

Figure 1:
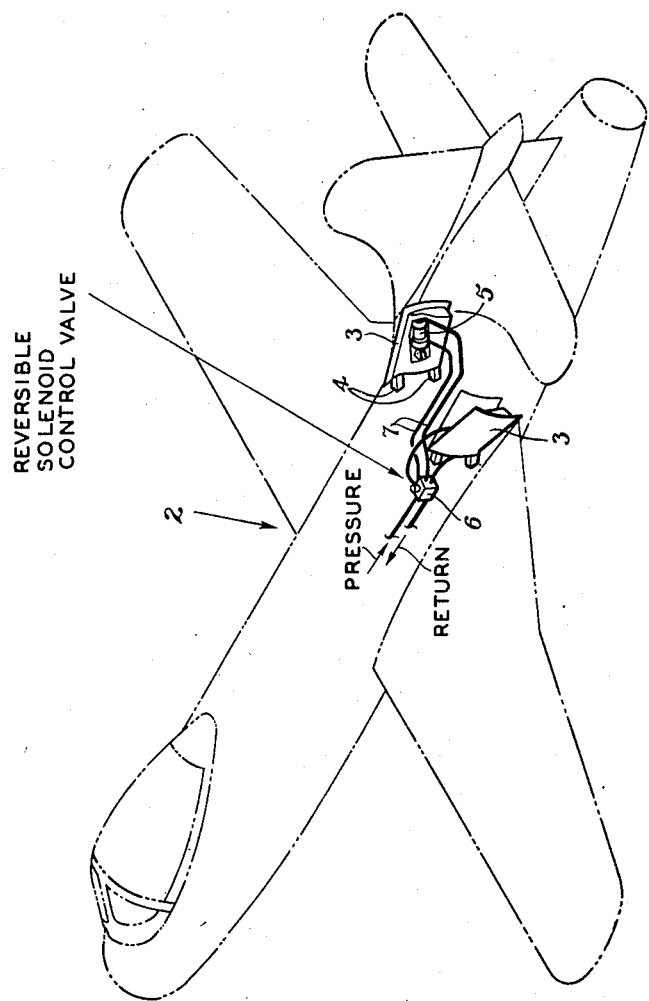
Fig. 1 is a perspective view of an aircraft having the air brakes and air brake actuating mechanism according to this invention.

Referring to Fig. 1, an airplane is generally indicated at 2 having fuselage brake flaps 3 which can be pivoted from a flush position to an extended position about a pair of hinges 4 by means of a hydraulic actuating cylinder 5. An electrically operated solenoid valve 6 directs fluid under pressure through the hydraulic lines 7 to either side of the piston in cylinder 5. The valve 6 is thus reversibly movable while further capable of locking the cylinder 5 in any position when the valve is in neutral, i. e., not displaced in either of its two directions of movement.

The automatic controller to be described herein functions so as to limit the speed of an aircraft during a dive or any high speed condition. It receives its primary intelligence from a Mach number meter or other speed measuring device and functions to slow down the aircraft by means of a surface which can be projected into the air stream. This surface or brake can extend from either the fuselage or the wings. In this particular embodiment, the brake is a flap extending from the fuselage. This brake flap may be actuated by either a hydraulic or pneumatic cylinder or by an electric motor, and such actuators may be controlled by an electric valve or switch.

Figure 2:
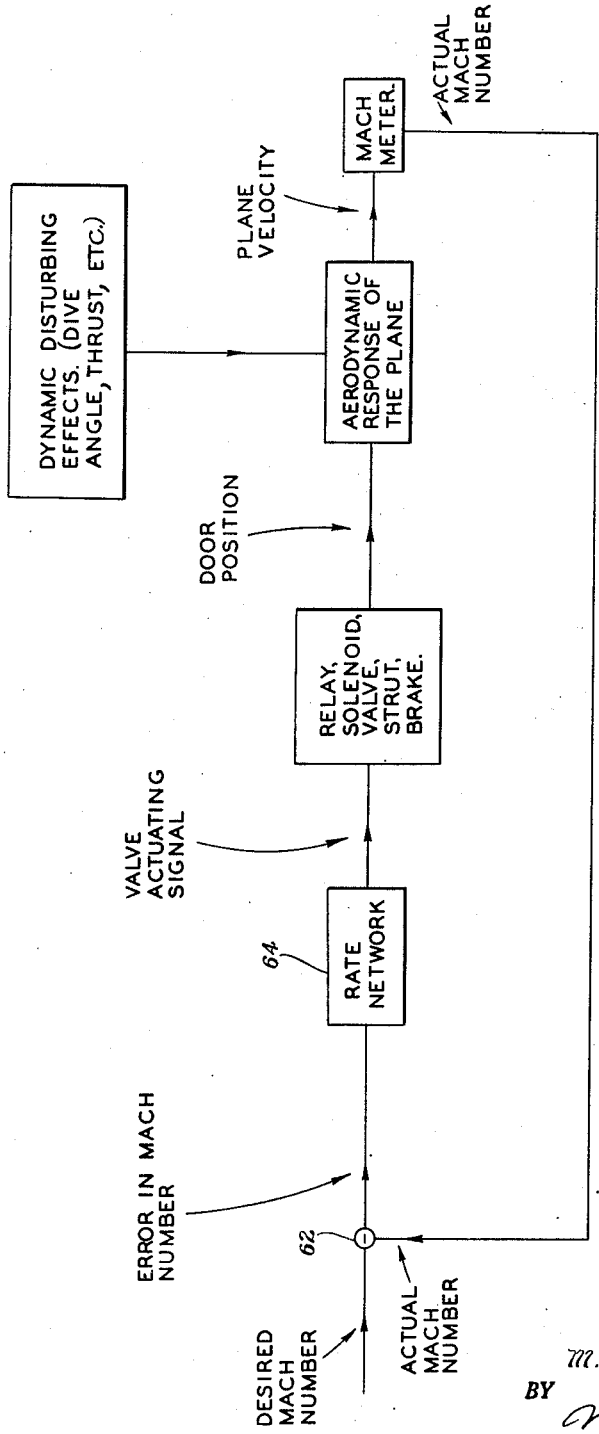
Fig. 2 is a schematic diagram of one modification of the controlling mechanism.
Figure 5:
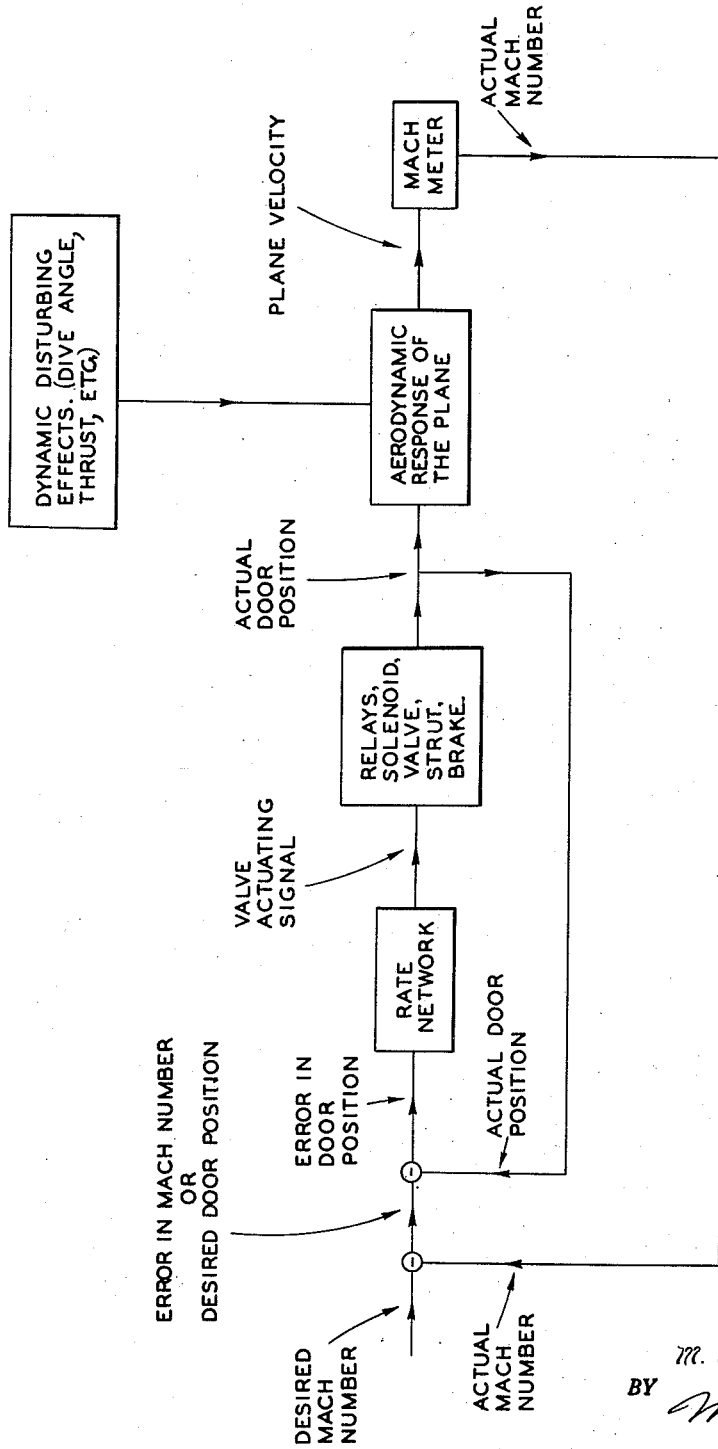
Fig. 5 is a schematic diagram of a modification of the controlling mechanism.

An electric transducer is coupled to the aircraft's speed measuring device such as an airspeed indicator or Mach meter, as represented schematically in Figs. 2 and 5, causing the transducer's electrical output to be a measure of the speed of the aircraft and in turn the resulting signal is used to actuate a polarized sensitive relay to control the brake flap. In a modification of the device, a second electrical transducer is similarly fixed to the brake flap, causing the second transducer's output to be a measure of the angular movement or extension of the air brake flap. The automatic speed brake controller, by means of the sensitive polarized relay, compares the electrical output of the two transducers and produces a control system as schematically shown in Fig. 5. An electronic amplifier may precede the polarized relay to amplify the transducers' outputs if this is required to actuate the relay. The speed brake strut itself is controlled by the sensitive relay using intermediate relays and the aforementioned electrical valve or switch 6.

Figure 3:
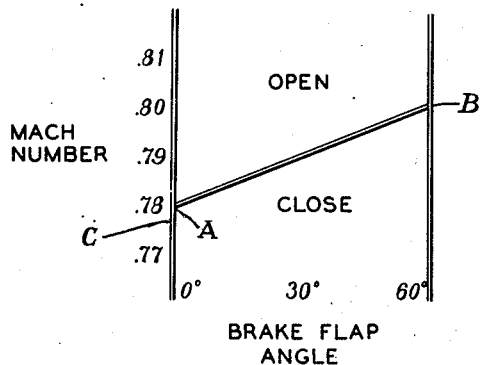
Fig. 3 is a diagrammatic functional chart of the brake mechanism.

Fig. 3 illustrates a typical relation of brake angle (degree of extension) and Mach number (speed) as used in the automatic controller represented schematically in Fig. 5. Below a predetermined speed, point A (Fig. 3), the brake is closed completely and will be flush with its adjacent surface such as a wing or fuselage. After a second predetermined speed, point B, the brake has been actuated to an open or fully extended position in the air stream. At speeds between A and B, the brake angle or degree of extension as signalled via the controller is a function of the increment of speed above A. This function is shown as linear for simplicity, but is not necessarily so.

In addition the sensitive polarized relay may be made to further respond to the rate of change of speed (in either of the modifications mentioned) by including a parallel combination of a condenser and variable resistance connected between the Mach number transducer and the polarized sensitive relay. Thus, referring to the modification represented in Fig. 5 and the diagram in Fig. 3, the signal sent to the sensitive polarized relay produces an "open" signal to the brake flap when the rate of change of speed is positive (speed increasing) and a "close" signal when the rate of change of speed is negative (speed decreasing). This rate network is only active when the speed is higher than some point C. In general, point C is equal to or less than point A.

Figure 4:
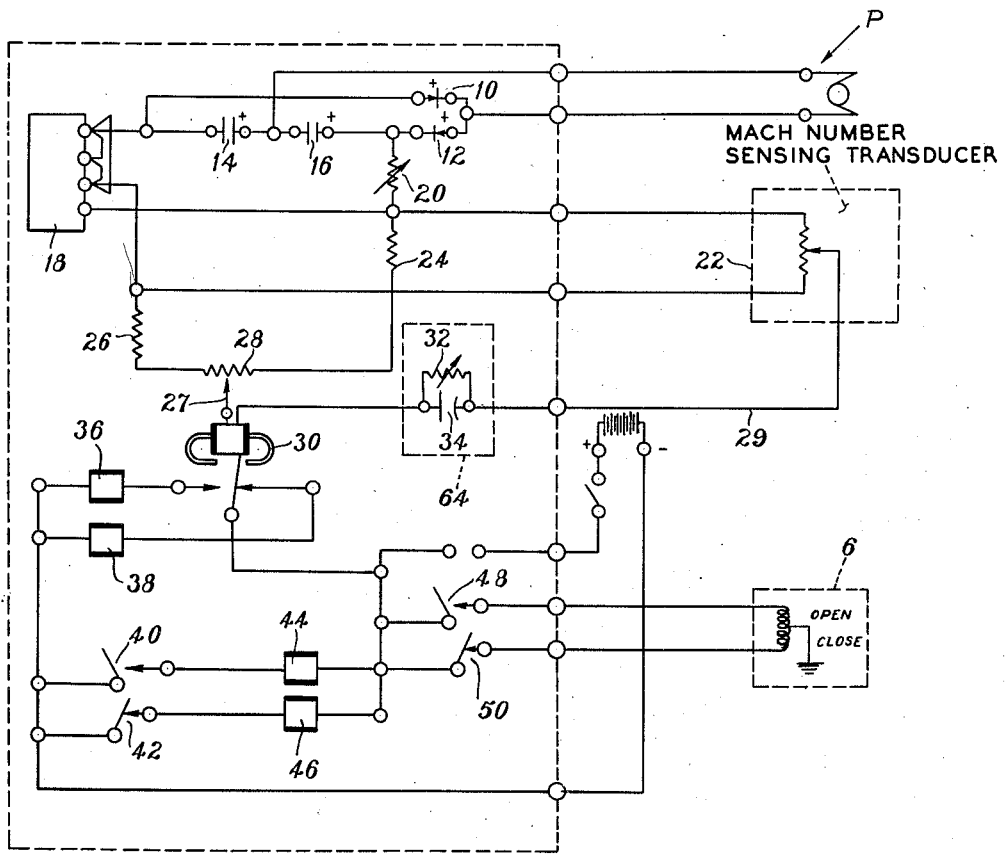
Fig. 4 is a wiring diagram of the basic controlling mechanism.

Referring now to Fig. 4 a typical electrical diagram, adaptable to the modifications mentioned, is illustrated. The rectifiers 10 and 12 and condensers 14 and 16 obtain alternating current from a power source P and operate as a voltage doubler and rectifier so that in conjunction with the voltage regulator tube 18 and variable adjusting resistor 20 a closely regulated 75 volts D. C. is supplied to the system. This voltage is applied across a bridge circuit, one side of which is the Mach meter transducer 22 and the other side of which is composed of the resistors 24 and 26 and potentiometer 28. The output of this bridge is obtained across the taps of potentiometer 28 and the transducer 22 via the arm 27 and the line 29, respectively. This output is then utilized to actuate a slave circuit or servo circuit comprising a sensitive polarized relay 30 so that current in one direction through the sensitive relay will close contacts which will actuate a relay 36 while current in the opposite direction through sensitive relay 30 will close contacts to actuate relay 38. The contacts 40 and 42 of relays 36 and 38, respectively, operate their respective relays 44 and 46. The contacts 48 of relay 44 actuate the solenoid hydraulic valve 6 in one direction and the contacts 50 of relay 46 similarly operate the solenoid hydraulic valve 6 in the opposite direction. The valve 6 controls the flow of the hydraulic or pneumatic fluid to the brake flap actuating cylinder. Fig. 4 indicates the slave circuit being energized for one direction of movement of the solenoid valve 6.

The primary difference in the modifications shown schematically in Figs. 2 and 5 lies in the type of connection made to the arm 27 which taps current from the potentiometer 28. Thus as represented by the Fig. 2 schematic modification the arm 27 (Fig. 4) is adjusted to a fixed position on the ground or can be connected to a pilot's control so that the limit Mach number can be varied somewhat or fixed. In the modification illustrated schematically in Fig. 5 the arm 27 (Fig. 4) is operatively connected mechanically or electrically to the brake flap so that the movements of arm 27 along potentiometer 28 will be a function of door position thereby obtaining a somewhat different result to be described more fully hereinafter.

A typical cycle of operation would be as follows: When the tap on the Mach number transducer 22 moves in the direction of increasing Mach number, the increasing voltage across resistor 32 and capacitor 34 (the rate network) causes a current which is the sum of the currents through each to flow through polarized relay 30. The current through resistor 32 is directly proportional to the degree of unbalance between the bridge leg including resistors 24, 26 and potentiometer 28 and the bridge leg represented by the transducer 22. Thus, for example, an air speed above the standard will induce a certain current which can be defined as a speed above standard or Mach number error. On the other hand, the current through the condenser 34 is proportional to the rate of change of voltage across the bridge and is therefore a function of acceleration either positive or negative. The rate network actually induces a high sensitivity and stability in the control system. It may be noted that it is the algebraic sum of the two currents which actuates polarized relay 30; and hence a speed lower than the limit Mach number and a negative rate of change of speed causes current to flow in a direction which will cause the solenoid valve 6 to operate the brake flap toward a close or decrease drag position. A speed higher than limit Mach number and a positive rate of change of speed causes current to flow in the opposite direction through the relay thereby causing the brake to open and increase drag. Drag increases tend to decrease both the speed and the rate of change of speed; the converse is also true.

Fig. 2 represents a schematic diagram of the basic automatic speed controller circuit. The Mach meter ordinarily senses the air speed from a pitot-static tube combination and by means of a transducer such as 22 (Fig. 4) produces an impulse which is carried to a bridge connection represented at 62. Bridge connection 62 also receives an impulse from the setting which was made on the ground or selected by the pilot, and these two impulses are combined through bridge 62 to produce a resultant impulse which is given to the rate network 64. There will be a difference in the electrical impulse from the Mach meter leg of the bridge and from the pre-set leg of the bridge, and this difference as mentioned above is called a Mach number error. It is this error that is sent to the rate network which consists primarily of the resistance-capacitance arrangement 32, 34 (Fig. 4). From the rate network, the signal is sent to the polarized relay 30, and eventually to the solenoid valve 6, thereby permitting the passage of fluid to the actuating cylinder 5. The door is then moved as determined by the signal which the controlling solenoid valve has received. A variation of the airplane speed will now ensue, and because of this change, the Mach meter will receive a different static-dynamic impulse from the air stream and, in turn, the Mach meter transducer will send out a new signal proportional to the new air speed of the aircraft.

The particular configuration shown in Fig. 2 does not utilize a transducer on the brake flap; i. e., a transducer responsive to brake flap position. Hence as mentioned above the output of the speed measuring transducer is passed through the resistance-capacitance network 32, 34, which provides a rate or lead component in the electrical output. This output is used to actuate sensitive relay 30, which may or may not be preceded by an amplifier, depending on the strength of the signal. This lead component will first actuate the brake to "open" at lower and lower speeds as the rate of change of speed increases in a positive direction; the Mach number at which the brake is first actuated to "close" becomes higher and higher as the rate of change of speed becomes more negative. The embodiment just described would be termed an "off-on velocity type" controller.

In Fig. 5, the same system as described above is in effect with the addition of a minor loop that will electrically indicate the actual door position and which will combine the door position indicator signal to the Mach number error signal at the bridge. This may be accomplished by transmitting flap motion proportionately to the arm 27 (Fig. 4) of potentiometer 28. The difference, then, of the door position signal and the Mach number error signal, which is obtained from the bridge, including the variation caused therein by reason of the rate network 32, 34 is then transmitted to the polarized relay 30 and subsequently to the slave circuit. It can be seen that, by sending a signal through from the door in its actual position, a stable type of response can be obtained in that, as soon as the door position changes, the impulse sent to the circuit from the bridge will be varied an amount in relationship with the difference between the Mach meter error signal and the actual door position signal.

It should be noted that the off-on velocity type controller represented by Fig. 3 is more sensitive, while the brake flap position type controller system (Fig. 5) is more stable. Further, the flap position feed-back as shown in Fig. 5 may be replaced by a variety of feed backs such as a mechanism based on flap pressure, flap hinge moment or even flap drag as may be desired.

It is evident, then, that as a result of this invention a high speed aircraft may be automatically controlled to accurately limit its maximum speed or Mach number.

Also as a result of this invention a speed controller has been provided whereby a predetermined Mach number limit can be automatically adhered to during varied flight conditions.

Although the embodiments of the invention illustrated herein indicate a preferred arrangement it will be evident that various changes and modifications may be made without departing from the scope of this novel concept.

I claim:

1. In an aircraft, a drag producing surface mounted on said aircraft and movable between a zero and high drag position relative thereto, means for actuating said surface, and control mechanism responsive to the relative air speed of said aircraft for automatically controlling said actuating means to limit the maximum air speed of said aircraft including balance means comprising an electrical transducer in a bridge circuit for presetting said maximum air speed and including activating means operatively connected to said actuating means.

2. In combination, an aircraft, a drag producing surface mounted on said aircraft and movable into a plurality of positions for creating drag of varied intensities, means for actuating said surface, control mechanism for automatically controlling said actuating means to limit the maximum speed of said aircraft including means establishing a standard for presetting said maximum speed limit, and means for sensitizing said mechanism including elements responsive to the air speed of said aircraft and to accelerations and decelerations of said aircraft.

3. In combination, an aircraft, a drag producing surface mounted on said aircraft and movable into a plurality of positions for creating drag of varied intensities, means for actuating said surface, control mechanism responsive to the air speed of said aircraft for automatically controlling said actuating means to limit the maximum speed of said aircraft including means establishing a standard for presetting said maximum speed limit, means for sensitizing said mechanism including elements responsive to accelerations and decelerations of said aircraft, and means responsive to the intensity of said drag for stabilizing said control mechanism including a member operatively connected to said surface.

4. In combination, an aircraft, a drag producing surface mounted on said aircraft and movable into a plurality of positions for creating drag of varied intensities, means for actuating said surface, control mechanism responsive to the air speed of said aircraft for automatically controlling said actuating means to limit the maximum speed of said aircraft including means establishing a standard for presetting said maximum speed limit, said mechanism comprising means for comparing the actual speed of said aircraft with said standard, means for sensitizing said mechanism including elements responsive to accelerations and decelerations of said aircraft, and means responsive to the intensity of said drag for stabilizing said control mechanism including a member operatively connected to said surface.

5. In an aircraft, a drag producing surface mounted on said aircraft and movable between a zero and high drag position relative thereto, means for actuating said surface, and electrical control mechanism for activating said actuating means including means for establishing a first signal, means responsive to the relative air speed of said aircraft for producing a second signal to be combined in said mechanism with said first signal to automatically control said actuating means and limit the air speed of said aircraft and means for adjustably varying said first signal to regulate the controlling operation of said mechanism.

6. A device according to claim 5 wherein the electrical control mechanism includes a rate network for further varying said signal including elements responsive to accelerations and decelerations of said aircraft.

7. In an aircraft, a drag producing surface mounted on said aircraft and movable between zero and high drag positions, means for actuating said surface including electrical control means therefor, and electrical control mechanism responsive to the relative air speed of said aircraft for producing a signal to said control means whereby said surface is moved and a proportional drag produced, said mechanism including an air speed responsive circuit and signal varying means in electrically bridged relation for regulating said electrical control means to limit the speed of said aircraft.

8. In an aircraft, a drag producing surface pivotally mounted to said aircraft, means for actuating said surface into a plurality of varied drag positions in relation to said aircraft, means for controlling said actuating means to limit the maximum speed of the aircraft comprising, a bridge, a transducer forming one leg of said bridge and being responsive to air speed for producing a signal proportionate thereto, means comprising another leg of said bridge for establishing a comparator circuit whereby a resultant signal is produced, a rate network responsive to rates of change in said resultant signal to produce a lead component therein, means responsive to the position of said surface relative to said aircraft for providing a feed-back component to said resultant signal including a second transducer operatively connected to said surface, a slave circuit including a power source therefor, and means responsive to the polarity of said energized slave circuit for activating said actuating means in a direction consistent with said polarity.

9. In an aircraft, a drag producing surface pivotally mounted to said aircraft and movable into and out of a plurality of positions whereby a varied amount of drag is produced, means for actuating said surface, a speed measuring instrument carried by the aircraft, a source of electrical power, means for converting the speed measurements of said instrument into electrical energy of corresponding graduated values including operative connections to said power source, an electrical standard bridged to said converting means including adjusting means therein for establishing a predetermined value corresponding to a desired air speed, means for comparing the output of said bridged connections including a rate network responsive to rate of change of said output for producing a final proportionately varied output, a slave circuit, selector means responsive to the polarity of said final output for energizing said slave circuit in a direction consistent with said polarity, and means responsive to the energization of said slave circuit for controlling said surface actuating means to limit said aircraft speed including valve mechanism operative in response to the direction of energization of said slave circuit.

10. In an aircraft, a drag producing surface pivotally mounted on said aircraft and movable into a plurality of positions for creating drag of varied intensities, a source of electrical energy, means for regulating said voltage, an air speed measuring device carried by the aircraft, means for converting the speed measurements of said instrument into equivalent electrical potential including operative connections to said voltage regulating means, resistance means having an electrically bridged connection with said converting means, said resistance means forming an electrical standard corresponding to a predetermined air speed value whereby a resultant signal is produced from said bridged connection, a rate network operatively connected to said resistance means and said converting means for varying said signal in response to the rate of change of potential from said bridged connection in electrically positive and negative directions, a servomechanism operatively connected to said drag producing surface, and means responsive to the polarity of said varied signal for actuating said servomechanism in a direction consistent with said polarity whereby said surface is moved to a drag producing position to maintain said aircraft below said predetermined air speed.

11. A device according to claim 10 wherein stabilizing means is provided comprising means responsive to the position of said drag producing surface for inducing a feed-back component to said varied signal.

12. In an automatic air brake controller for an airplane, the combination of, a source of electrical power, means responsive to the air speed of said airplane for producing a signal comprising a transducer having a connection to said power source, means forming an electrical standard for presetting the speed limit of the aircraft including connections to said power source for obtaining a signal therefrom, means for combining said signals including means responsive to accelerations and decelerations of said aircraft, and means for receiving the combined signal from said combining means including elements responsive to the direction of said combined signal for operating said air brake.

13. A device according to claim 12 wherein said signal combining means includes a second transducer responsive to operation of said air brake for stabilizing said combined signal.

14. In a method of controlling the maximum speed of an aircraft including movable air brakes therefor, the steps comprising, measuring the speed of the aircraft in flight and converting said speed measurement into an electrical potential, electrically comparing said potential with that of an electrical standard and obtaining a resultant signal therefrom, said standard defining the maximum desirable speed of the aircraft, transmitting said resultant signal through a rate network whereby a lead component is induced in said signal in response to the rate of change of potential therein in positive and negative directions, electrically varying the output of said rate network in proportion to the position of said movable air brakes, and passing said varied electrical output through a polarity sensitive slave circuit to control the direction of movement of said air brakes.

M. ROBERT SELDON.

REFERENCES CITED

The following references are of record in the file of this patent:

UNITED STATES PATENTS

| Number | Name | Date |
|---|---|---|
| 1,418,131 | Curtiss | May 30, 1922 |
| 2,176,817 | Jacobson | Oct. 17, 1939 |
| 2,262,173 | Fischer | Nov. 11, 1941 |
| 2,351,079 | Strobel | June 13, 1944 |
| 2,390,084 | Edwards | Dec. 4, 1945 |
| 2,401,163 | Keller | May 28, 1946 |
| 2,414,430 | Nisbel | Jan. 14, 1947 |
| 2,460,843 | Ours | Feb. 8, 1949 |
| 2,461,967 | Devlin | Feb. 15, 1949 |
| 2,472,181 | Werth | June 7, 1949 |